United States Patent

[11] 3,614,065

| [72] | Inventors | Joseph Adamski<br>Brooklyn, Mich.;<br>James W. Grim, Toledo, Ohio |
|---|---|---|
| [21] | Appl. No. | 848,147 |
| [22] | Filed | Aug. 7, 1969 |
| [45] | Patented | Oct. 19, 1971 |
| [73] | Assignee | Dura Corporation<br>Oak Park, Mich. |

[54] VEHICLE JACK MECHANISM
2 Claims, 4 Drawing Figs.

| [52] | U.S. Cl. | 254/122 |
|---|---|---|
| [51] | Int. Cl. | B66f 3/22 |
| [50] | Field of Search | 254/122, 126 |

[56] References Cited
UNITED STATES PATENTS

| 1,982,642 | 12/1934 | Curok | 254/126 X |
|---|---|---|---|
| 2,920,871 | 1/1960 | Kolodin | 254/122 |
| 3,317,187 | 5/1967 | Steppon | 254/126 |

*Primary Examiner*—Robert C. Riordon
*Assistant Examiner*—David R. Melton
*Attorney*—Malcolm W. Fraser ABSTRACT: A scissors-type screw-actuated lift jack mechanism in which a secondary pair of links is mounted on the extended ends of the primary cross links to provide a substantial extended raised height of the lift jack while the mechanism in the retracted or lowered position is a more compacted and shortened package for storage purposes. The lift jack mechanism has a unique embodiment of a notch mechanism for engaging and retaining contact with the underbody structure of an automotive vehicle.

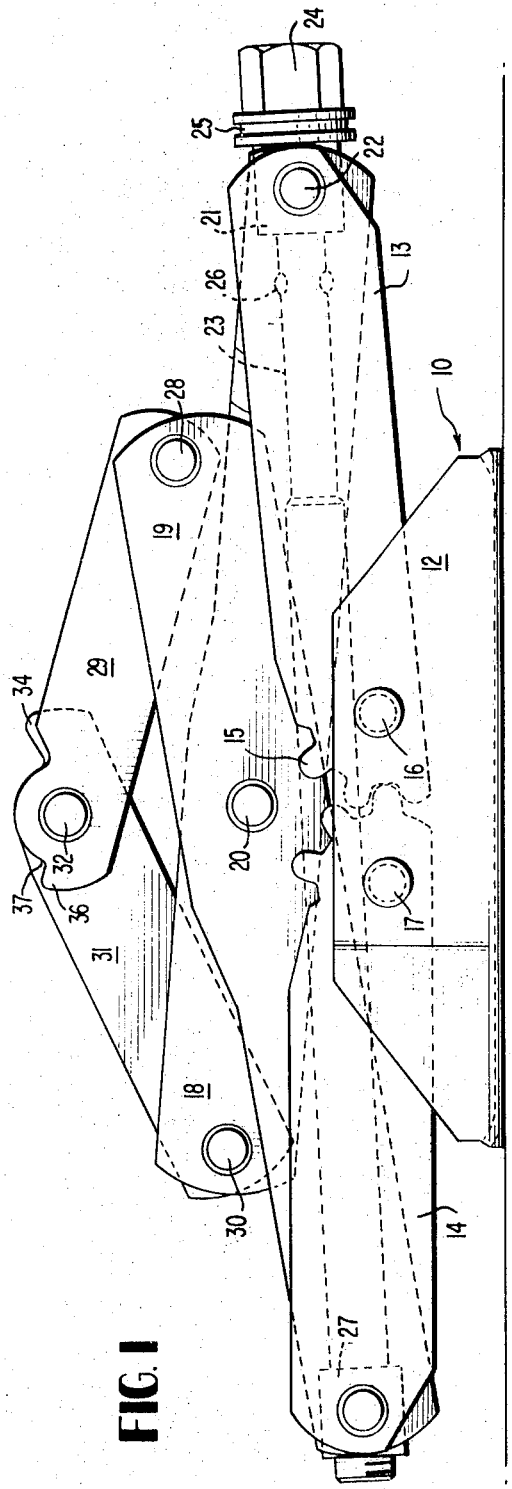
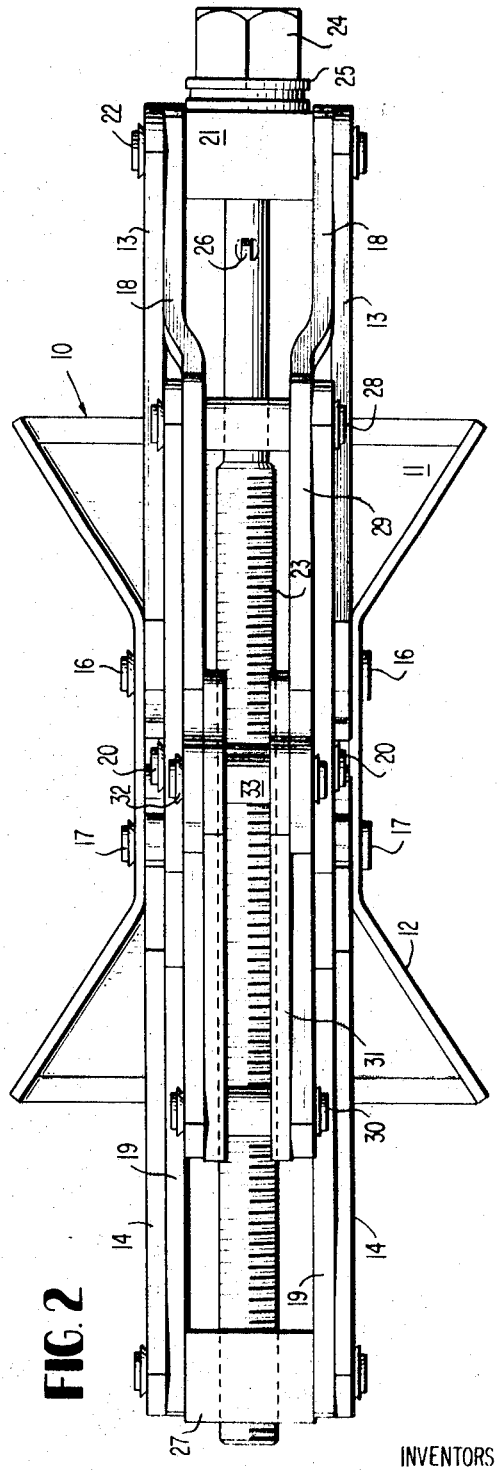

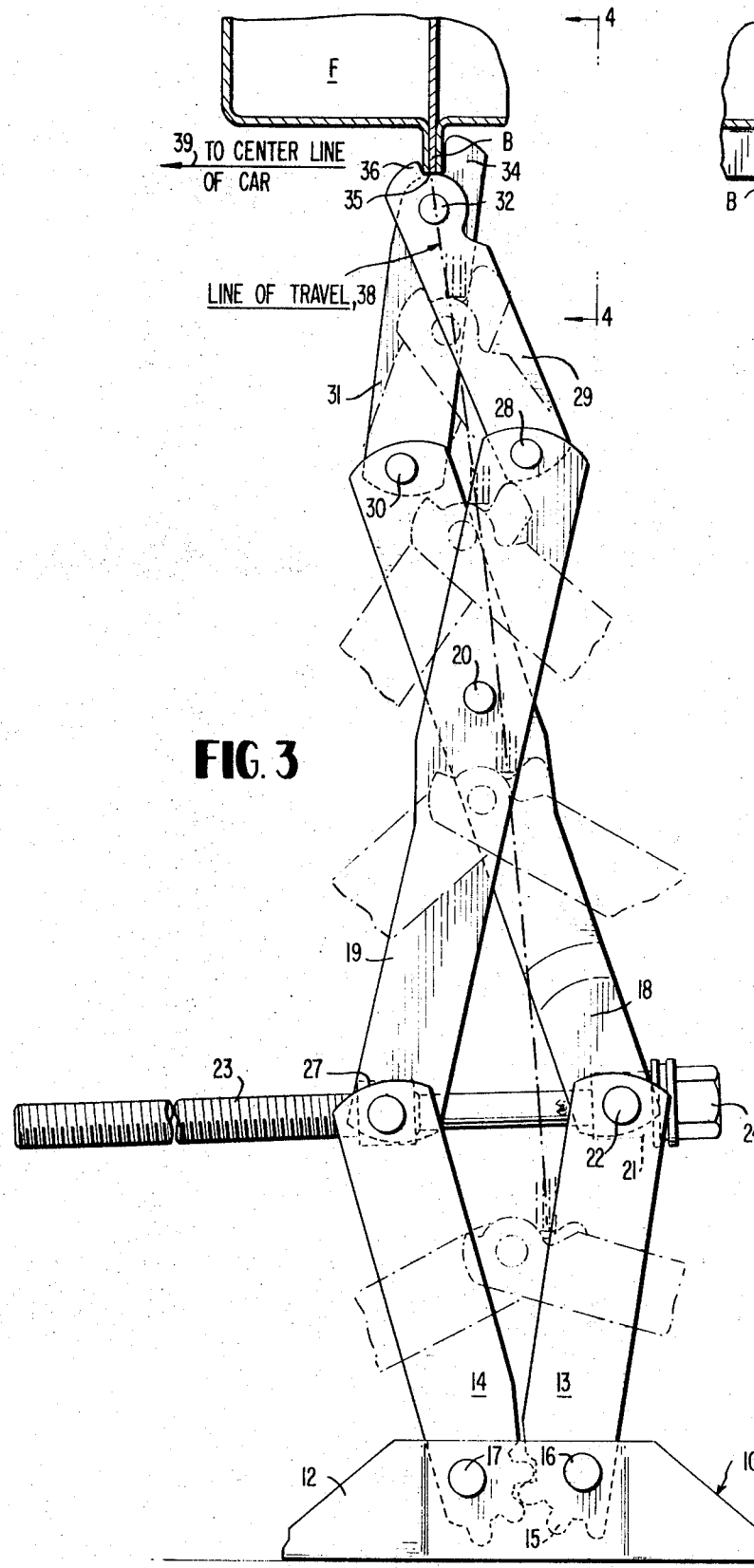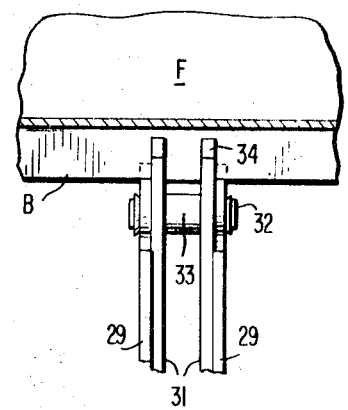

VEHICLE JACK MECHANISM

An object of this invention is to produce a scissors-type screw-operated lift jack having a secondary upper link arrangement which is attached to the upper ends of the primary lower links.

Another object is to produce a scissors-type lift jack in which the upper ends of the secondary upper links have configurations which by a pivotal connection of these links to each other form a unique notching arrangement for the engagement and retention of automobile body construction during raising and lowering of the latter.

A further object is to produce a screw-actuated scissors-type lift jack mechanism which has a substantial extended height capacity and an extremely shortened and compact package in the retracted position for storage in the trunk of a motor vehicle.

BRIEF DESCRIPTION OF THE DRAWINGS

FIG. 1 is a side elevation of the automobile jack, showing the same in it's compacted or retracted position;

FIG. 2 is a top plan view of the jack shown on FIG. 1;

FIG. 3 is a side elevation of the jack in it's raised or extended position, showing the same in engagement with an automobile; and FIG. 4 is a fragmentary side elevation on the line 4—4 of FIG. 3.

DESCRIPTION OF THE PREFERRED EMBODIMENT

The illustrated embodiment of the invention comprises a scissors-type screw-actuated lift jack mechanism for automobiles comprising a sheet metal base 10, which viewed in plan is of generally hourglass shape with a narrow central section and outwardly flared end sections. The base 10 has a flat ground engaging bottom wall 11 and upstanding laterally spaced sidewalls 12, the end portions of which are downwardly and outwardly inclined. Pivoted to the inner sides of the narrow central section of the base 10 are pairs of right- and left-hand drive links 13 and 14, respectively, the links of each pair being arranged respectively adjacent the sidewalls 12 of the base. The drive links 13 and 14 are of similar construction, but not identical inasmuch as the adjacent ends thereof are formed with slightly different gear sectors 15, which are adapted to mesh with each other during the raising and lowering movements of the jack mechanism. The right-hand drive links 13 are pivoted to portions of the sidewall 12 of the base by pivot pins 16, and the left-hand drive links 14 are pivoted to the sidewall 12 by pivot pins 17. The pivot pins 16 are spaced slightly above the pivot pins 17 for a purpose hereinafter described.

The pairs of drive links 13 and 14 are pivoted at their upper ends to the lower ends of scissor links 18 and 19, respectively, which are pivotally connected by a pivot pin 20 disposed at about two-thirds of the length measured from the lower ends of the links. A spreader block 21 is interposed between the pairs of links 13 and 18, particularly as shown on FIG. 2. The block 21 is formed with integral oppositely extending pivot pins 22 which extend through and provide pivots for respective links 13 and 18. The block 21 is provided with a central hole disposed at right angles to the axis of the pivot pins 22, and extending therethrough is the unthreaded end portion of a rod 23, the major portion of which is formed with helical screw threads. On the unthreaded end of the rod 23 is a polygonal wrench-receiving head 24, and interposed between the head 24 and the block 21 are thrust washers 25. The rod 23 is provided with stakes 26 to limit the movement of the block 21 along the rod, as will be readily understood. It will be understood that a crank handle (not shown) having a socket to fit the head 24 is employed for rotating the screw-threaded rod 23 in one direction or the other for raising or lowering the jack mechanism.

Providing a spacer for the pairs of links 14 and 19, respectively, is a block 27 which is similar to the block 21, and thus provides a pivotal connection between the links 14 and 19, respectively, but instead of having an unthreaded opening for the rod 23, the hole that extends through the block 27 is threaded for screw-threaded engagement with the threaded portion of the rod 23. Manifestly, by rotation of the rod 23 in one direction, the pivotal connections of the several links to each other to form a scissors arrangement are either moved away from each other to effect lowering movement, or toward each other to effect raising movement. It will be quite apparent that movement of the lower ends of the links 18 away from the links 19 causes lowering of the jack mechanism, whereas movement in the opposite direction causes raising of the mechanism.

The upper ends of the links 19 are pivotally connected by a pin 28 equipped with a suitable spacer sleeve to relative short links 29. Similarly the upper ends of the links 18 are connected by a pin 30 equipped with a suitable spacer sleeve to relative short links 31. As shown, the links 29 and 31 are somewhat shorter than the links 13 and 14, and are of the order of one-half the length of the links 18 and 19. The upper end portions of the links 29 and 31 are pivotally connected by a pin 32, which is similarly equipped with a suitable spacer sleeve as indicated at 33.

The upper ends of the links 31 beyond the pivot pin 32 are reduced in width to provide extensions 34 on the right-hand side (FIG. 3), and thereby providing arcuate ledges or notches 35 for retentive engagement with the vehicle part. The ends of the links 29 beyond the pivot 32 are also reduced in width to provide on the left-hand side relative short extensions 36 (FIG. 3) and these extensions provide ledges 37 which constitute part of arcuate surfaces coaxial with the pins 32 to afford rocking to and from operative position.

As shown in FIGS. 3 and 4, F designates a fragment of an automobile body, normally referred to as a unit body, such body being formed with a downwardly extending bead B, which is engaged and retained during raising and lowering movements by the extensions 34 and 36 of the links 29 and 31, which may be called a secondary pair of links.

As previously mentioned, the pivot pin 16 for the driving links 13 is slightly above the pivot pin 17 for the driving links 14. This enables the jack to operate in an arc which is depicted by the line 38 on FIG. 3. The more the pivot pin 16 is raised, the flatter will be the arc indicated by the line 38. On the other hand, the more the pivot pin 16 is lowered, the greater will be the curvature of the line of travel 38. It will thus be understood that the shorter the wheel base of the automobile, the more abrupt the arc indicating the line of travel should be. On the other hand, the longer the wheel base, the flatter the arc indicating the line of travel should be, and this would be accommodated by the proper location of the pivot pin 16 with relation to the pivot pin 17.

The extensions 34 on the links 31 operate to apply a lifting force angularly against the vehicle bead B. It will be understood that the side of the body that is raised moves in an arcuate line and this jack mechanism is designed to accommodate itself to such movement. Thus, the angular force exerted by the extensions 34 is in the direction of the arrow 39 appearing on FIG. 3 which indicates the direction to the center line of the automobile.

One feature is that the lifting force exerted by the jack extends along a line from the top pivot pin 32 to a point midway between the base pivot pins 16 and 17. As a result, the jack has greater stability and there is less chance of its tipping.

It will also be understood that by employing the upper links 29 and 31, the other links forming the jack mechanism can be made shorter, so that as a consequence the jack occupies less space in its retracted position, and can be more conveniently stored.

What we claim is:

1. A lifting jack for an automobile body provided with a downward beadlike extension comprising, in combination, a base, pivotally connected scissor links, link means connecting the lower ends of said scissor links to said base, means to actuate said links for effecting raising and lowering movements,
supplemental links pivoted respectively to the upper ends of said scissor links,
a pivotal connection between the upper end portions of said supplemental links,
integral curvilinear ledges on the outer end portions of said supplemental links and coaxial with each other and with said pivotal connection, and
integral extensions projecting from opposite sides of said supplemental links respectively adjacent said curvilinear ledges, whereby when in lowered position the beadlike extension of the body can rest on said curvilinear ledges.

2. A lifting jack as claimed in claim 1, comprising pivotal connecting means between said pivotally connected scissor links and said base including a connection between one link and said base at a position above the connection of the other link and said base thereby to effect a predetermined curve formed by the line of travel.